United States Patent Office 3,651,014
Patented Mar. 21, 1972

3,651,014
SEGMENTED THERMOPLASTIC COPOLYESTER
ELASTOMERS
William K. Witsiepe, Wilmington, Del., assignor to E. I.
du Pont de Nemours and Company, Wilmington, Del.
No Drawing. Continuation-in-part of application Ser. No.
843,243, July 18, 1969. This application June 22, 1970,
Ser. No. 48,503
Int. Cl. C08g 17/08
U.S. Cl. 260—75 R                            11 Claims

ABSTRACT OF THE DISCLOSURE

A segmented thermoplastic copolyester elastomer containing recurring polymeric long chain ester units derived from dicarboxylic acids and long chain glycols and short chain ester units derived from dicarboxylic acids and low molecular weight diols. About 50-90% of the total number of short chain ester units must be derived from a single dicarboxylic acid and a single low molecular weight diol. The elastomers have exceptional properties, particularly tear-strength, abrasion resistance and resistance to oil swell.

RELATED APPLICATIONS

This application is a continuation-in-part of co-pending application Ser. No. 843,243, filed July 18, 1969 and now abandoned.

BACKGROUND OF THE INVENTION

Linear copolyesters have been produced heretofore for various purposes, particularly for the production of films and fibers, but known polymers of this type are not suitable for some applications such as, for example, molded vehicle tires where superior tear strength, tensile strength, flex life and abrasion resistance are desirable and even necessary. There has been a need for a thermoplastic elastomer having these properties in combination with low oil swell and good electrical resistivity. A thermoplastic elastomer which additionally can be processed to produce finished articles by economical processes such as injection molding, blow molding, rotational molding, etc. would be highly desirable.

SUMMARY OF THE INVENTION

According to this invention there is provided a thermoplastic copolyester elastomer consisting essentially of a multiplicity of recurring intralinear long chain and short chain ester units connected head-to-tail through ester linkages, said long chain ester units being represented by at least one of the following structures:

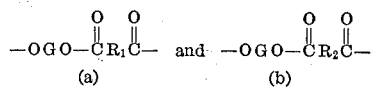

(a)            (b)

and said short chain ester units being represented by at least two of the following structures:

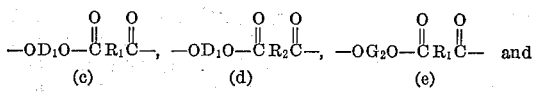

(c)          (d)          (e)

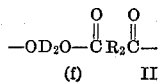

(f)       II where G is a divalent radical remaining after removal of terminal hydroxyl groups from a long chain polymeric glycol, that is, a glycol having a molecular weight above about 600 and a melting point below about 55° C.;

$R_1$ and $R_2$ are different divalent radicals remaining after removal of carboxyl groups from different dicarboxylic acids each having a molecular weight less than about 300;

$D_1$ and $D_2$ are different divalent radicals remaining after removal of hydroxyl groups from different low molecular weight diols, that is, having molecular weights less than about 250.

The short chain ester units in the thermoplastic copolyester provide about 30-60% of the weight of said copolyester; about 50-90% of said short chain ester units in the copolyester are identical and a homopolymer of such ester units in its fiber-forming molecular weight range has a melting point above 174° C.; also a polymer formed from all short chain ester units in the copolyester has a melting point in its fiber-forming molecular weight range of less than 200° C.

DETAILED DESCRIPTION

The term "long chain ester units" as applied to units in a polymer chain, refers to the reaction product of a long chain glycol with a dicarboxylic acid. Such "long chain ester units," which are a repeating unit in the copolyesters of this invention, correspond to the Formulas a or b above. The long chain glycols are polymeric glycols having terminal (or as nearly terminal as possible) hydroxy groups and a molecular weight above about 600 and preferably from about 600–6000. The long chain glycols used to prepare the copolyesters of this invention are generally poly(alkylene oxide) glycols or glycol esters of poly(alkylene oxide) dicarboxylic acids. The chemical structure of the long chain polymeric part of the long chain glycol is not critical and any substituent groups can be present which do not interfere with polymerization of the compound with glycol(s) or dicarboxylic acid(s), as the case may be, to form the polymers of this invention. Thus, the chain can be a single divalent acrylic, alicyclic, or aromatic hydrocarbon group, poly(alkylene oxide) group, polyester group, a combination thereof, or the like which meets the other requirements set forth herein and any of these can contain substituents which do not interfere to a substantial extent with polymerization to form copolyesters of this invention. The hydroxy functional groups of the long chain glycols which react to form the copolyesters should be terminal groups to the extent possible.

The trm "sort chain esteh units" as applied to units in a polymer chain refers to low molecular weight compounds or polymer chain units having molecular weights less than about 550. They are made by reacting a low molecular weight diol (below about 250) with a dicarboxylic acid to form a repeating unit corresponding to the Formulas c, d, e or f above.

The term "dicarboxylic acid" as used herein is intended to include the condensation polymerization equivalents of dicarboxylic acids, that is, their esters or ester-forming derivatives such as acid chlorides and anhydrides, or other derivatives which behave substantially like dicarboxylic acids in a polymerization reaction with a glycol.

The melting points specified herein are determined by extinction of polarized light observed while the sample is heated on a hot stage microscope substantially by the procedure described in "Preparative Methods of Polymer Chemistry," Sorenson and Campbell, Interscience Publishers, Second Edition, 1968, pp. 53–55. The melting point is the average of the temperatures at which the first and last sample particles blend with the background while heating at 1° C./minute after first annealing the sample for 30 minutes at a temperature about 20° C. below the approximate melting point.

Compared to polyesters known to the art, the polymers of the present invention show a substantial improvement in (a) hand tear, (b) flex life, and (c) resistance to swelling in oils and fuels of high aromatic content when stocks of similar hardness are compared. Abrasion resistance and compression set of the polymers are also good. In addition, the polyesters of the present invention achieve optimum physical properties at more conveniently prepared lower molecular weights.

The copolyesters of this invention are prepared by polymerizing with each other (a) one or more dicarboxylic acids or their equivalents (their esters or ester-forming derivatives such as acid chlorides, anhydrides, etc.), (b) one or more linear long chain glycols, and (c) one or more low molecular weight diols, provided; however, that two or more dicarboxylic acids or their equivalents are utilized when only one short chain diol is present, and two or more short chain diols are used when only one dicarboxylic acid or its equivalent is present. The polymerization reaction can be effected by conventional procedures, as for example, in bulk or in a solvent medium which dissolves one or more of the monomers.

The dicarboxylic acid monomers useful herein have a molecular weight less than about 300. They can be aromatic, aliphatic or cycloaliphatic. The dicarboxylic acids can contain any substituent groups or combination thereof which do not interfere with the polymerization reaction. Representative dicarboxylic acids include terephthalic and isophthalic acids, bibenzoic acid, substituted dicarboxy compounds with benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid, etc. and $C_1$–$C_{10}$ alkyl and other ring substitution derivatives thereof such as halo, alkoxy or aryl derivatives. Hydroxy acids such as p($\beta$-hydroxyethoxy) benzoic acid can also be used providing an aromatic dicarboxylic acid is also present.

"Aromatic dicarboxylic acids" are dicarboxylic acids in which each carboxy group is attached to a carbon atom in an isolated or fused benzene ring such as those mentioned above. "Aliphatic dicarboxylic acids" are acids in which each carboxy group is attached to a fully saturated carbon atom or to a carbon atom which is part of an olefinic double bond. If said carbon atom is in a ring, the acid is cycloaliphatic, if not, it is aliphatic. Representative aliphatic and cycloaliphatic acids are sebacic acid, 1,3- or 1,4-cyclohexane dicarboxylic acid, adipic acid, glutaric acid, succinic acid, carbonic acid, oxalic acid, itaconic acid, azelaic acid, diethylmalonic acid, fumaric acid, citraconic acid, allylmalonate acid, 4-cyclohexene-1,2-dicarboxylate acid, pimelic acid, suberic acid, 2,5-diethyladipic acid, 2-ethylsuberic acid, 2,2,3,3-tetramethylsuccinic acid, cyclopentanedicarboxylic acid, decahydro-1,5- (or 2,6-) naphthylene dicarboxylic acid, 4,4'-bicyclohexyl dicarboxylic acid, 4,4'-methylenebis(cyclohexyl carboxylic acid), 3,4-furan dicarboxylate, and 1,1-cyclobutane dicarboxylate. The preferred aliphatic acids, are the cyclohexanedicarboxylic acids and adipic acid.

It is important that the dicarboxylic acid have a molecular weight less than about 300 and aromatic acids with 8–16 carbon atoms are preferred. Particularly preferred are the phenylene dicarboxylic acids such as terephthalic and isophthalic acid. The acid molecular weight requirement pertains to the acid itself and not to its ester or ester-forming derivative. Thus, the ester of a dicarboxylic acid having a molecular weight greater than 300 is included in this invention provided the acid has a molecular weight below about 300.

Included among the low molecular weight (less than about 250) diols which react to form short chain ester units of the copolyesters are acyclic, alicyclic and aromatic dihydroxy compounds. Preferred are diols with 2-15 carbon atoms such as ethylene, propylene, isobutylene, tetramethylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis( p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided however, that the molecular weight requirement pertains to the diol only and not to its derivatives. Ethylene glycol cannot be used as the low molecular weight diol when all or part of the dicarboxylic acid is an aliphatic acid because of the reduced hydrolytic stability of such systems.

The long chain glycols used in this invention have a molecular weight of about 600–6000, a melting point less than about 55° C. and the carbon to oxygen ratio in the long chain glycol exceeds about 2.5. Although long chain glycols having a carbon to oxygen ratio less than 2.5 can be used, they are not recommended because the resulting polymers have a higher swell in water and poorer resistance to hydrolysis. Long chain glycols which can be used in preparing polymers of this invention include the poly(alkylene oxide) glycols (wherein alkylene is $C_3$–$C_8$) such as poly(1,2- and 1,3-propylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol and poly(1,2-butylene oxide) glycol; random or block copolymers of ethylene oxide and 1,2-propylene oxide (used in proportions such that the carbon to oxygen mole ratio in the glycol exceeds 2.5) and poly-formals prepared by reacting formaldehyde with glycols, such as pentamethylene glycol, or mixtures of glycols, such as a mixture of tetramethylene and pentamethylene glycols.

In addition, the dicarboxymethyl acids of poly(alkylene oxides) such as the one derived from polytetramethylene oxide

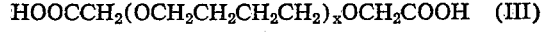

$$HOOCCH_2(OCH_2CH_2CH_2CH_2)_xOCH_2COOH \quad (III)$$

can be used to form long chain glycols in situ, as discussed below. Polythioether glycols and polyester glycols also provide useful products. In using polyester glycols care must generally be exercised to control a tendency to interchange during melt polymerization, but certain sterically hindered polyesters, e.g., poly(2,2-dimethyl-1,3-propylene adipate),
poly(2,2-dimethyl-1,3-propylene/2-methyl-2-ethyl-1,3-propylene 2,5-dimethtylterephthalate),
poly(2,2-dimethyl-1,3-propylene/2,2-diethyl-1,3-propylene, 1,4-cyclohexanedicarboxylate) and
poly(1,2-cyclohexylenedimethylene/2,2-dimethyl-1,3-propylene 1,4-cyclohexanedicarboxylate)

can be utilized under normal reaction conditions and other more reactive polyester glycols can be used if a short residence time is employed. Either polybutadiene or polyisoprene glycols, copolymers of these and saturated hydrogenation products of these materials are also satisfactory long chain polymeric glycols. In addition, the glycol esters of dicarboxylic acids formed by oxidation of polyisobutylene diene copolymers are useful raw materials.

Although the long chain dicarboxylic acids (III) above can be added to the polymerization reaction mixture as acids, they react with the low molecular weight diol(s) present, these always being in excess, to form the corresponding poly(alkylene oxide) ester glycols which then polymerize to form the G units in the polymer chain, these particular G units having the structure $$-D_1OCCH_2(OCH_2CH_2CH_2CH_2)_xOCH_2COOD_1- \quad (IV)$$

when only one low molecular weight diol (corresponding to $D_1$) is employed. When more than one diol is used, there can be a different diol cap (e.g., $D_1$ and $D_2$) at each end of the polymer chain unit. Such dicarboxylic acids may also react with long chain glycols if they are present, in which case a material is obtained having a formula the same as IV above except the D's are replaced with polymeric residues of the long chain glycols. The extent to which this reaction occurs in quite small, however, since the low molecular weight diol is present in considerable molar excess.

In producing the polyesters of this invention a single long chain glycol or a mixture of them can be used. In the latter case there will be more than one G unit in the polymer chain (e.g., $G_1$, $G_2$, etc.) and the number of different long chain units will be proportionately increased. In any event the long chain glycol(s) react with a mixture of at least one low molecular weight diol and at least one dicarboxylic acid, there being at least two diols or at least two such acids present, to form a thermoplastic polyester in which long and short chain ester units are connected head-to-tail through ester linkages, the long chain ester units being represented by one or more of the structures indicated by (I) above. The low molecular weight diols in the mixture react with one or more dicarboxylic acids to form short chain ester units in the thermoplastic polyester elastomer, these ester units being represented by at least two of the structures in group (II) above.

In place of a single low molecular weight diol, a mixture of such diols can be used; in place of a single long chain glycol or equivalent, a mixture of such compounds can be utilized and in place of a single low molecular weight dicarboxylic acid or its equivalent; a mixture of two or more can be used in preparing the thermoplastic copolyester elastomers of this invention, provided that the sum of the different low molecular weight diols and dicarboxylic acids is at least three. Thus, the letter "G" in Formula I above can represent the residue of a single long chain glycol or the residue of several different glycols, and the letters $D_1$ and $D_2$ in Formula II can represent the residues of one or several low molecular weight diols. When an aliphatic acid is used which contains a mixture of geometric isomers, such as the cis-trans isomers of cyclohexane dicarboxylic acid, the different isomers should be considered as different compounds forming different short chain ester units with the same diol in the copolyesters of this invention.

Short chain ester units of Formula II must contribute 30-60% of the weight of the copolyester and it is important for attainment of the properties herein described that about 50-90% of the total short chain ester units be identical, that is be the reaction product of a single low molecular weight dicarboxylic acid with a single low molecular weight diol. They will normally be distributed statistically throughout the polymer backbone. Moreover, it is equally important that these identical ester units are such that a homopolymer in the fiber-forming molecular weight range, i.e., 5000 or more, formed from such units has a melting point above about 174° C. A list of a number of aromatic polyesters with their melting points can be found on pages 155–157 of "Fibres From Synthetic Polymers" edited by Rowland Hill, Elsevier Publishing Company, 1953.

An important feature of the polymers of this invention is the presence in the polymer backbone of at least two different short chain ester units, as in the case where a polymer is made from one glycol (HOGOH), one diol (HOD$_1$OH) and at least two dicarboxylic acids $$(HOOCR_1COOH, HOOCR_2COOH)$$

In such a case, these dicarboxylic acid units are distributed randomly throughout the polymer so that the final polymer contains in its backbone the following units

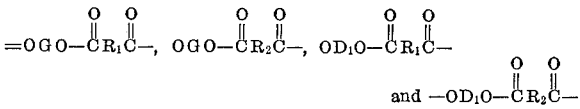

where G, $D_1$, $R_1$ and $R_2$ have the meanings described above with $R_1$ being different from $R_2$. For example, in a preferred embodiment of this invention wherein a polyester with statistical distribution of units is made from polytetramethyleneether (PTME) glycol having a molecular weight of about 1000, terephthalic (T) acid, isophthalic (I) acid and 1,4-butene-diol (B), the short chain ester units have the following structures

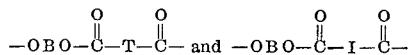

and the long chain ester units have the following structures

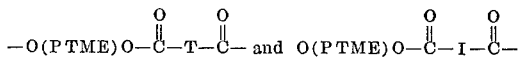

In the case where the polymer is made from the same glycol, two diols 1,4-butanediol (B) and 1,5-pentane diol (P) and only one dicarboxylic (T) acid the short chain ester units will have the following structures

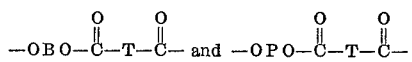

and the long chain ester units will have the structure

As indicated above the copolyester elastomer contains at least one long chain ester unit and at least two short chain ester units and the latter are present in an amount sufficient to provide 30–60% of the weight of the copolyester elastomer. Moreover, one of the short chain ester units must be present in an amount of 50–90% of all the short chain ester units present and a homopolymer in the fiber-forming molecular weight range of that ester unit would have a melting point above 174° C. A polymer in the fiber-forming molecular weight range formed from all of the short chain ester units would have a melting point less than 200° C. The "fiber forming molecular weight range" is above about 5,000. The foregoing description is not intended to require that the short chain ester units as they appear in the copolyester actually form a polymer having a molecular weight greater than 5000, but is intended to mean that the short chain ester units be chosen such that if a polymer (homopolymer in the case of the identical units) were formed from such short chain ester units, it would have a melting point as indicated.

The copolyesters prepared from terephthalic acid, isophthalic acid, 1,4-butane diol and polytetramethylene ether glycol having a molecular weight of about 600–3000 are particularly preferred in this invention. The raw materials are readily available and the physical properties of such polymers, especially their tear strength, are outstanding. In general, copolyesters having 65–85% of their short chain ester units identical are preferred.

The polymers described in this invention can be made conveniently by a conventional ester interchange reaction. A preferred procedure involves heating the mixed dimethyl esters of terephthalic and isophthalic acids, with a long chain glycol and a molar excess of a short chain diol in the presence of a catalyst at 150 to 260° C. followed by distilling off methanol formed by the interchange. Heating is continued until methanol evolution is complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

The resulting prepolymer is then carried to high molecular weight by distillation of the excess of short chain diol. Best results are usually obtained if this final distillation is run at less than 1 mm. pressure and 240–260° C. for less than 2 hours in the presence of antioxidants such as sym-di-beta-naphthyl-p-phenylenediamine and 1,3,5-trimethyl-2,4,6-tris[3,5-ditertiary-butyl-4-hydroxybenzyl] benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as $Mg[HTi(OR_6)]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

While these condensation polymerizations are generally run in the melt without added solvent, it is sometimes advantageous to run them in the presence of inert solvent in order to facilitate removal of volatile products at lower than usual temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers.

The processes described above can be run both by batch and continuous methods. The preferred method for continuous polymerization, i.e., by ester interchange of a prepolymer, is a well established commercial process.

Although the copolyesters of this invention possess many desirable properties, it is sometimes desirable to stabilize certain of the compositions to heat or radiation by ultraviolet light. Fortunately, this can be done very readily by incorporating stabilizers in the polyester compositions.

Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4' - bis(2,6 - ditertiary-butylphenol), 1,3,5-trimethyl - 2,4,6 - tris[3,5-ditertiary-butyl-4-hydroxybenzyl] benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenylsalicylate. Typical amine stabilizers include N,N'-bis-(beta-naphthyl)-p-phenylenediamine, N,N'-bis(1-methylheptyl)-p-phenylene diamine and either phenyl-beta-naphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft polyesters of this invention.

Because of their relatively high melt index (particularly at low shear), excellent thermal stability at processing temperatures, rapid hardening rates, excellent flow and mold wetting characteristics, and relative insensitivity to moisture, the polymers of this invention can be processed by substantially all procedures which have been used for thermoplastics in general and, in many instances, these polymers offer significant processing advantage over competitive thermoplastic polymers. The materials can be injection, compression, transfer and blow molded to form elastic molded articles, which may include inserts, if desired, meeting close tolerances. They can be readily extruded to produce films (blown or unblown), tubing, other forms having complicated cross sections, and crosshead extruded for hose, wire, cable and other substrate covers. They can be readily calendered to produce films and sheeting or to produce calender-coat woven and nonwoven fabrics and other substances.

In finely divided form, the polymers of this invention offer the above-mentioned processing advantages for procedures employing powdered thermoplastics. In addition, the polymers of this invention can be used in crumb form. The unique flow characteristics of these polymers give excellent definition on molded surfaces and facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber and heat fused coating (for flexible substrates).

The melt viscosity and stability characteristics of these polymers offer advantages for use in certain coating and adhesive procedures such as dip, transfer, roller and knife coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendering operations and allows penetration into the substrate, if desired.

All parts, proportions and percentages disclosed herein are by weight unless otherwise indicated. The following examples illustrate the invention.

The following ASTM methods are employed in determining the properties of the polymers prepared in the examples which follow.

| | |
|---|---|
| Modulus at 100% elongation, $M_{100}$ | D412 |
| Modulus at 300% elongation, $M_{300}$ | D412 |
| Tensile at break, $T_B$ | D412 |
| Set at break, $S_B$ | D412 |
| Set at 300% elongation, $S_{300}$ | D412 |
| Split tear | D470 |
| Bashore resilience, percent | D1054 |
| Compression set | D395 |
| Trouser tear | [1] D470 |
| Clash-Berg torsional mod. | D1053 |
| Brittle point | D746 |
| Flex life | D813 |
| Volume resistivity | D991 |
| Oil swell | D471 |

[1] Modified by use of 1.5" x 3" sample with 1.5" cut on the long axis of the sample. This configuration prevents "necking down" at the point of tearing.

CATALYST A

Magnesium metal (1.41 g., 0.058 g. atom) is added to 300 ml. of dry butanol-1 and the butanol is refluxed for about four hours in the absence of moisture. The magnesium reacts to form a gelatinous mass after which 36.0 g. (0.106 mole) of tetrabutyl titanate is added and reflux continued for an additional hour. The resulting homogenous solution is cooled and bottled until required.

CATALYST B

Solution 1 is prepared by dissolving 111.05 ml. of tetrabutyl titanate in 900 ml. of dry butanol-1.

Solution 2 is prepared by dissolving 3 g. of anhydrous magnesium acetate in 100 ml. of dry methanol.

In the examples which follow, the use of 1 ml. of Solution 1 plus 0.5 ml. of Solution 2 gives substantially the same results obtained with 1 ml. of Catalyst A.

Example 1

The following materials are placed in a 300 ml. distillation flask fitted for distillation:

Polytetramethyleneether glycol (PTMEG); number average molecular weight about 1000—35.0 ml.
1,4-butanediol (BDO)—25.0 ml.
Dimethyl terephthalate (DMT)—31.0 g.
Dimethyl isophthalate (DMI)—9.0 g.
Sym-di-beta-naphthyl-p-phenylenediamine—0.15 g.

A stainless steel stirrer with a paddle cut to conform with the internal radius of the flask is positioned about 1/8" from the bottom of the flask and agitation is started. The flask is placed in an oil bath at 200° C., agitated for five minutes and then 0.3 ml. of Catalyst A is added. Methanol distillation starts almost immediately and distillation is practically complete in twenty minutes. The temperature of the oil bath is maintained for one hour after the addition of catalyst. The temperature of the bath is then increased to 260° C. over about thirty minutes. The pressure on the system is then reduced to 0.5 mm. of Hg or less (about 0.1 mm. of Hg measured with a McLeod gauge at the pump) and distillation at reduced pressure is continued for about ninety minutes. The resulting viscous molten product is scraped from the flask in a nitrogen (water and oxygen free) atmosphere and allowed to cool. The inherent viscosity of the product at a concentration of 0.5 g./dcl. in a mixed solvent of 60 parts liquid phenol [1]/40 parts 1,1,2-trichloroethane is 1.45. Samples for physical testing are prepared by compression molding at 175–185° C. for one minute and cooling rapidly in the press. The polymer has a Shore A hardness of 91.

[1] A mixture of 90 parts by weight phenol and 10 parts by weight water.

For comparison a prior art control polymer is prepared by the same process using dimethyl terephthalate alone in place of a mixture of dimethyl terephthalate and dimethyl isophthalate. The amounts of materials used are listed below:

Polytetramethyleneether glycol; number average molecular weight about 1000—25.0 g.
1,4-butanediol—17.5 ml.
Dimethyl terephthalate—17.5 g.
Sym-di-beta-naphthyl-p-phenylenediamine—0.075 g.
Catalyst A—0.3 ml.

The resulting control polymer has an inherent viscosity of 1.97 measured as described before in this example. Samples for physical testing by the above ASTM methods are prepared by compression molding at 170–180° C. for one minute and cooling rapidly in the press. The control polymer has a Shore A hardness of 90 or about the same as the polymer of this example.

Properties of the polymer of this example and the control polymer are shown in Table I.

TABLE I

| | Polymer of this example | Control |
|---|---|---|
| Short chain ester units, percent by weight | 48.5 | 33.1 |
| Identical short chain ester units, mole percent | 77.5 | 100 |
| Melting point, short chain ester unit homopolymer,[1] ° C. | 232 | 232 |
| Melting point, short chain ester unit copolymer,[2] 25° C. | 190 | |
| $M_{100}$, p.s.i. | 1,225 | 1,150 |
| $M_{300}$, p.s.i. | 1,560 | 1,550 |
| $T_B$, p.s.i. | 5,900 | 5,700 |
| $E_B$, percent | 805 | 810 |
| Split tear, p.l.i. | 170 | 140 |
| 70° C.: | | |
| $M_{300}$, p.s.i. | 1,305 | 1,110 |
| $T_B$, p.s.i. | >2,560 | >2,200 |
| Bashore resilience, percent | 53 | 60 |
| Compression set, percent Method B, 22 hrs./70° C. | 60 | 60 |
| Trouser tear, p.l.i.: | | |
| 5"/min. | 710 | 800 |
| 50"/min. | 400 | 90 |
| Clash-Berg torsional mod., ° C. for $10^4$ p.s.i. | −40 | −76 |
| Brittle point, ° C. | −94 | −94 |
| De Mattia flex, notched cycles to failure | >1.6×10⁶ | 0.35×10⁶ |
| Volume resistivity, ohms/cm. at $10^3$ cycles: | | |
| 24° C./50% R.H. | 7.7×10¹⁴ | 5×10¹² |
| 24° C./100% R.H. | 6.7×10¹⁴ | 3×10¹² |
| Oil swell, percent volume increase, ASTM No. | | |
| 3 oil, 7 days, 100° C. | 22 | 40 |
| Ref. Fuel B, 7 days, 25° C. | 28 | 40 |

[1] The short chain ester unit homopolymer is prepared by polymerizing dimethylterephthalate with an excess of 1,4-butanediol to form a polymer having a molecular weight greater than 5,000 following substantially the reaction conditions described hereinbefore in this example.

[2] The short chain ester unit copolymer is prepared by polymerizing a mixture of dimethylterephthalate and dimethylisophthalate present in the same proportions as in the formulation of this example, with an excess of 1,4-butanediol to form a polymer having a molecular weight greater than 5,000, following the reaction conditions hereinbefore described in this example.

The stress-strain properties of the polymer of this invention are in general quite similar to those of the prior art polymer of about equal hardness. However, the Trouser Tear strength of the polymer of this invention at a high tearing rate is more than four times the tear of the prior art polymer. Significant improvements in flex life, volume resistivity and oil swell are also observed for the polymer of this invention relative to the prior art control.

Another control polymer prepared and having the same composition as above but having an inherent viscosity of 1.45 has a tensile strength ($T_B$) of only 2500–3000 (compared with 5900 for the instant polymer) and other properties listed above would be similarly deficient. Polymers of 1.45 inherent viscosity are readily produced on a commercial basis whereas polymers with viscosities above 1.5 are difficult to produce on a commercial basis.

Example 2

Substantialy following the procedures described in Example 1, a thermoplastic copolyester elastomer is prepared from the following materials.

Polytetramethylene ether glycol, number average molecular weight 984—24.6 ml.
Dimethyl terephthalate—29.4 g.
1,4-butanediol—18.2 g.
1,3-propanediol—3.9 g.
Sym-di-beta-naphthyl-p-phenylenediamine—0.165 g.
Catalyst A—0.36 ml.

The resulting product has an inherent viscosity of 1.68 measured by the procedure described in Example 1. Samples for physical testing are prepared by compression molding at 200–235° C. for one minute and cooling rapidly in the press.

Properties of the polymer at 25° C. are shown in Table II.

TABLE II

| | |
|---|---|
| Short chain ester units, percent by weight | 50 |
| Identical short chain ester units, mole percent | 80 |
| Melting point, identical short chain ester unit [1] homopolymer, ° C. | 232 |
| Melting point, short chain ester unit [2] copolymer, ° C. | 194 |
| $M_{100}$, p.s.i. | 1235 |
| $M_{300}$, p.s.i. | 1550 |
| $T_B$, p.s.i. | 4550 |
| $E_B$, percent | 630 |
| Trouser tear, p.l.i., 50″/min. | 215 |
| Shore A hardness | 90 |
| Compression set, percent, Method B, 22 hrs./70° C. | 65 |
| Clash-Berg torsional modulus, ° C. for $10^4$ p.s.i. | −37 |

[1] Prepared by polymerizing DMT with 1,4-butanediol as described for the homopolymer in Example 1.
[2] Prepared by polymerizing DMT with a mixture of 1,4-butanediol and 1,3-propanediol, present in the same proportions as are in the formulation of this example, to prepare a polymer having a molecular weight above 5000. The conditions of the polymerization are substantially the same as described in Example 1.

The Shore A hardness of this polymer matches the hardness of the control polymer of Example 1, but its Trouser Tear is more than twice that of the control.

Example 3

Following the procedure described in Example 1, a polymer is prepared from the following materials.

Polytetramethyleneether glycol; number average molecular weight about 1000—35.0 ml.
1,4-butanediol—25.0 ml.
Dimethyl terephthalate—28.0 g.
Dimethyl isophthalate—12.0 g.
Sym-di-beta-naphthyl-p-phenylenediamine—0.15 g.
Catalyst A—0.6 ml.

The inherent viscosity of the product measured by the method described in Example 1 is 1.55. The polymer has a Shore A hardness of 85. Properties of the polymer are listed in Table III. Samples for physical testing by the above ASTM procedures are prepared by compression molding for one minute at 175–185° C. and cooling the mold rapidly in the press.

TABLE III

| | |
|---|---|
| Short chain ester units, percent by weight | 48.5 |
| Identical short chain ester units, mole percent | 70.0 |
| Melting point, short chain [1] ester unit homopolymer, ° C. | 232 |
| Melting point, short chain [2] ester unit copolymer, ° C. | 176 |
| 25° C.: | |
| $M_{100}$, p.s.i. | 790 |
| $M_{300}$, p.s.i. | 1020 |
| $T_B$, p.s.i. | 5400 |
| $E_B$, percent | 750 |
| $S_B$, percent | 115 |
| $S_{300}$, percent | 115 |
| Split tear, p.l.i. | 125 |
| Bashore resilience, percent | 53 |
| Compression set, percent Method B, 22 hrs./70° C. | 67 |
| Trouser tear, p.l.i.: | |
| 5″/min. | 705 |
| 50″/min. | 305 |

[1] Prepared the same way as the short chain ester unit homopolymer described in Example 1.
[2] Prepared the same way as the short chain ester unit copolymer of Example 1 except the proportions of DMT and DMI were the same as in the formulation of this example.

It will be noted that the polymer of this example contains the same concentration of short chain ester segments and a smaller proportion of terephthalate ester segments than does the polymer of Example 1.

Example 4

Following the procedure described in Example 1, two polymers (4A and 4B) differing only in their proportions of terephthalate ester segments and isophthalate ester segments are prepared. The concentration of total short chain ester units in these polymers is higher than that of the polymer of Example 1. The polymers are prepared from the following materials.

| | 4A | 4B |
|---|---|---|
| Polytetramethyleneether glycol, number average molecular weight about 1,000, ml | 35.0 | 35.0 |
| 1,4-butanediol, ml | 30.0 | 30.0 |
| Dimethyl terephthalate, g | 35.0 | 40.0 |
| Dimethyl isophthalate, g | 15.0 | 10.0 |
| Sym-di-beta-naphthyl-p-phenylenediamine, g | 0.15 | 0.15 |
| Catalyst A, ml | 0.6 | 0.6 |

Polymer 4A has an inherent viscosity of 1.52 and 4B an inherent of 1.63 measured by the method of Example 1. Polymers 4A and 4B have Shore A hardness of 89 and 92, respectively.

Samples for physical testing by the ASTM methods above are prepared by compression molding specimens for one minute at 175–185° C. and cooling the mold rapidly in the press. Properties of the polymers are listed in Table IV.

TABLE IV

| | 4A | 4B |
|---|---|---|
| Short chain ester units, percent by weight | 55.2 | 55.2 |
| Identical short chain ester units, mole percent | 70.0 | 80.0 |
| Melting point, short chain ester unit homopolymer,[1] ° C. | 232 | 232 |
| Melting point, short chain ester unit copolymer,[2] ° C. | 176 | 194 |
| 25° C.: | | |
| $M_{100}$, p.s.i. | 1,000 | 1,200 |
| $M_{300}$, p.s.i. | 1,300 | 1,550 |
| $T_B$, p.s.i. | 6,650 | 7,200 |
| $E_B$, percent | 660 | 670 |
| $S_B$, percent | 135 | 215 |
| $S_{300}$, percent | 120 | 136 |
| Split tear, p.l.i. | 143 | 173 |
| Bashore resilience, percent | | 51 |
| Compression set, percent, Method B, 22 hrs./70° C. | 80 | 60 |
| Trouser tear, p.l.i.: | | |
| 5″/min. | 720 | 820 |
| 50″/min. | 500 | 420 |

[1] Prepared as described in Example 1.
[2] Prepared as decribed in Example 1 except the DMT-DMI proportions are the same as in the polymer of this example.

Example 5

Substantially following the procedures described in Example 1, a polymer is prepared from the following materials.

Polytetramethylene ether glycol, number average molecular weight 984—25.2 ml.
Dimethyl terephthalate—23.3 g.
Dimethyl adipate—5.2 g.
1,4-butanediol—22.1 ml.
Sym-di-beta-naphthyl-p-phenylenediamine—0.165 g.
Catalyst A—0.36 ml.

The resulting product has an inherent viscosity of 1.82 measured by the procedure described in Example 1. Samples for physical testing are prepared by compression molding at 200–235° C. for one minute and cooling rapidly in the press.

Properties of the polymer at 25° C. are shown in Table V.

TABLE V

| | |
|---|---|
| Short chain ester units, percent by weight | 50 |
| Identical short chain ester units, mole percent | 80 |
| Melting point, identical short chain ester unit homopolymer, ° C. (same homopolymer as described in Example 1) | 232 |
| Melting point, short chain ester unit copolymer, ° C. (prepared the same way as the short chain ester copolymer described in Example 1 except a mixture of DMT and dimethyl adipate are employed in the same proportion as used in the formulation of this example) | 194 |
| $M_{100}$, p.s.i. | 1000 |
| $M_{300}$, p.s.i. | 1300 |
| $T_B$, p.s.i. | 6200 |
| $E_B$, percent | 885 |
| Trouser tear, p.l.i., 50″/min. | 160 |
| Shore A hardness | 92 |
| Compression set, percent, Method B, 22 hrs./70° C. | 44 |
| Clash-Berg torsional modulus ° C. for $10^4$ p.s.i. | −55 |

What is claimed is:

1. A segmented thermoplastic copolyester elastomer consisting essentially of a multiplicity of recurring long chain ester units and short chain ester units joined head-to-tail through ester linkages, said long chain ester units being represented by at least one of the formulas I
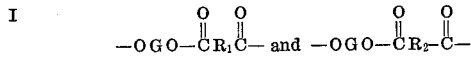

and said short chain units being represented by at least two of the formulas

II
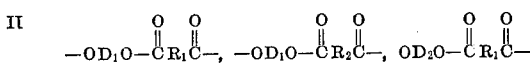

and

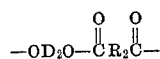

where G is a divalent radical remaining after the removal of terminal hydroxyl groups from a long chain glycol having a melting point of less than about 55° C., a molecular weight of about 600–6000, and a carbon-to-oxygen ratio greater than 2.5; $R_1$ and $R_2$ are divalent radicals remaining after removal of carboxyl groups from different aromatic dicarboxylic acids having a molecular weight less than about 300 and $D_1$ and $D_2$ are divalent radicals remaining after removal of hydroxyl groups from different diols having a molecular weight less than about 250; provided, (a) said short chain ester units amount to about 30–60% by weight of said copolyester,
(b) about 50–90% of the total number of said short chain ester units contained in said copolyester are identical,
(c) a homopolymer in the fiber-forming molecular weight range formed from said identical ester units has a melting point above 174° C., and
(d) a polymer in the fiber-forming molecular weight range formed solely from the total short chain ester units has a melting point less than 200° C.

2. A segmented thermoplastic copolyester of claim 1 wherein the dicarboxylic acids are aromatic dicarboxylic acids containing 8–16 carbon atoms.

3. A segmented thermoplastic copolyester of claim 1 wherein the low molecular weight diol is a $C_2$–$C_8$ aliphatic diol.

4. A segmented thermoplastic copolyester of claim 1 wherein the long chain glycol is a poly(alkylene oxide) glycol.

5. A segmented thermoplastic copolyester of claim 1 wherein about 65–85% of the total number of short chain ester units are identical.

6. A segmented thermoplastic copolyester elastomer of claim 1 formed by polymerization of
(a) a long chain glycol having a molecular weight of about 600–6000 and a melting point less than 55° C.,
(b) at least one $C_8$–$C_{16}$ aromatic dicarboxylic acid having a molecular weight less than about 300, and
(c) at least one aliphatic diol having a molecular weight less than 250.

7. A copolyester of claim 1 formed by copolymerizing (a) a poly(alkylene oxide) glycol, (b) dimethylterephthalate, (c) dimethylisophthalate, and (d) a $C_2$–$C_8$ aliphatic diol.

8. The copolyester of claim 7 in which the poly(alkylene oxide) glycol is poly(tetramethyleneether) glycol and the aliphatic diol is ethylene glycol, 1,4-butalnediol or cyclohexane dimethanol.

9. The copolyester of claim 8 wherein the aliphatic diol is 1,4-butanediol.

10. The copolyester of claim 8 wherein about 65–85% of the total number of the short chain ester units are identical.

11. The copolyester of claim 9 wherein about 65–85% of the total number of the short chain ester units are identical.

References Cited

UNITED STATES PATENTS

| | | |
|---|---|---|
| 3,023,192 | 2/1962 | Shivers. |
| 2,865,891 | 12/1958 | Michel. |
| 3,157,619 | 11/1964 | Bell et al. |
| 3,261,812 | 7/1966 | Bell et al. |
| 3,446,778 | 5/1969 | Waller et al. |
| 3,013,914 | 12/1961 | Willard. |
| 3,523,932 | 8/1970 | Smith et al. |

FOREIGN PATENTS

| | | |
|---|---|---|
| 779,054 | 7/1957 | Great Britain. |
| 6614948 | 4/1948 | Netherlands. |

MELVIN GOLDSTEIN, Primary Examiner

U.S. Cl. X.R.

260—40 R, 45.85, 45.9 R, 45.95, 47 C, 75 S, 873